United States Patent [19]

Yoshida et al.

[11] Patent Number: 5,657,095
[45] Date of Patent: Aug. 12, 1997

[54] SYSTEM FOR COMBINING IMAGE SIGNALS

[75] Inventors: Masayoshi Yoshida; Masaru Ishikawa, both of Saitama-ken, Japan

[73] Assignee: Pioneer Electronic Corporation, Tokyo, Japan

[21] Appl. No.: 618,093

[22] Filed: Mar. 19, 1996

Related U.S. Application Data

[63] Continuation of Ser. No. 260,230, Jun. 14, 1994, abandoned.

[30] Foreign Application Priority Data

Jun. 14, 1993 [JP] Japan ................................ 5-142182

[51] Int. Cl.⁶ .................................................. H04N 9/76
[52] U.S. Cl. ........................ 348/584; 348/588; 348/564
[58] Field of Search ................................ 348/584, 585, 348/588, 590, 589, 598, 599, 578, 36, 42, 563, 564; 358/183; H04N 9/74, 9/76, 5/262, 5/265, 5/268, 5/275

[56] References Cited

U.S. PATENT DOCUMENTS

| | | |
|---|---|---|
| 4,393,394 | 7/1983 | McCoy ................................ 358/22 |
| 4,602,286 | 7/1986 | Kellar et al. ......................... 348/584 |
| 4,694,344 | 9/1987 | Flora .................................... 348/584 |
| 4,851,912 | 7/1989 | Jackson et al. ..................... 348/585 |
| 4,970,595 | 11/1990 | Bloomfield ........................ 348/584 |
| 4,994,914 | 2/1991 | Wiseman et al. ................... 348/584 |
| 5,008,755 | 4/1991 | Brain ................................... 358/183 |
| 5,432,528 | 7/1995 | Ritter .................................. 345/115 |
| 5,592,236 | 1/1997 | Rosenbaum et al. .............. 348/586 |

FOREIGN PATENT DOCUMENTS 102487  5/1988  Japan ................................ H04N 9/74

*Primary Examiner*—John K. Peng
*Assistant Examiner*—Chris Grant
*Attorney, Agent, or Firm*—Nikaido Marmelstein Murray & Oram LLP

[57] ABSTRACT

A system for combining images has VTRs for storing a plurality of image signals and a signal generator for generating a key signal representing a combining position in each of the image signals. The key signals are added to the image signals. The composed image signals are combined with each other at the combining position based on the key signals.

2 Claims, 9 Drawing Sheets

FIG.2 a — FIRST IMAGE SOURCE FS    SECOND IMAGE SOURCE SS
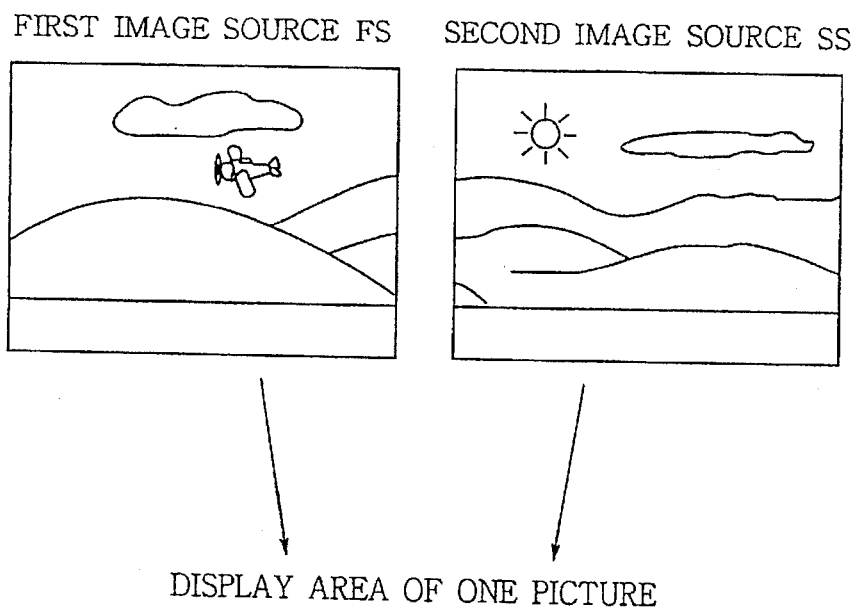
FIG.2 b
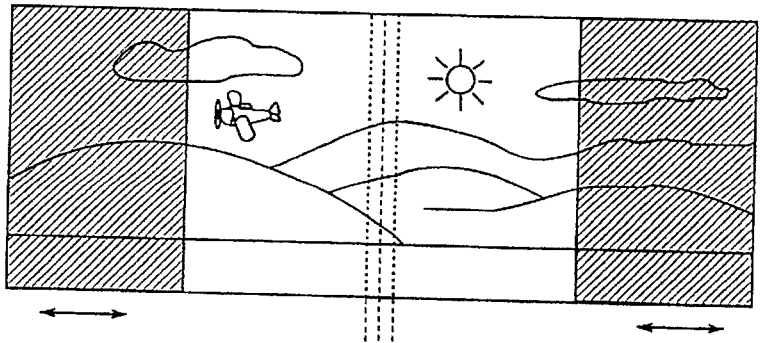
DISPLAY AREA OF ONE PICTURE
FIG.2 c
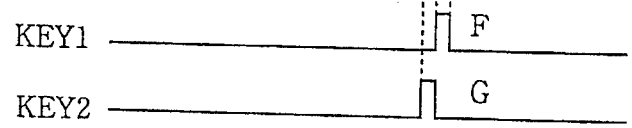
KEY1 —— F
KEY2 —— G

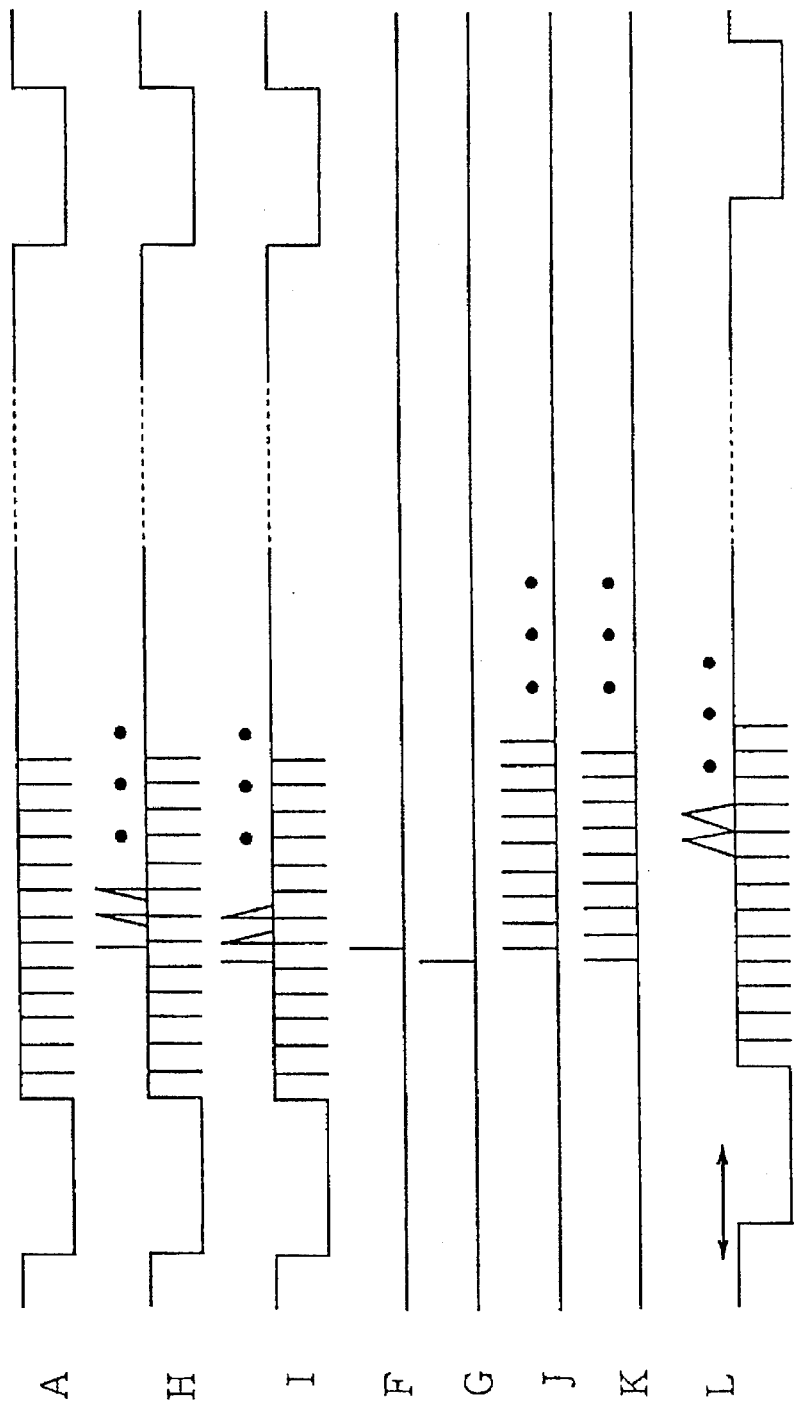

SYSTEM FOR COMBINING IMAGE SIGNALS

This application is a continuation of application Ser. No. 08/260,230 filed Jun. 14, 1994 now abandoned.

FIELD OF THE INVENTION

The present invention relates to a system for combining image signals (video signal) to form a continuous image where a display area of a combined image is optionally selected.

BACKGROUND OF THE INVENTION

In order to selectively display image (video) signals taken by a plurality of cameras, there has been a head switching method in which a desired image is selected from the image signals at a predetermined time interval. There has been another method in which a desired position of a desired image is combined with a desired position of another image to display a continuous image derived from a plurality of image signals.

If the image signal taken by the several cameras in which a continuous significant scene is included, it is desirable that the separate image signals can be combined with each other to form the continuous scene with accuracy, and the scene can be optionally and continuously scrolled in a display.

Such a system is effective to increase the display effect of a simulation device or game machines.

SUMMARY OF THE INVENTION

An object of the present invention is to provide a system in which separate positions in separate image signals can be combined to form a continuous image, and a scene in the continuous image can be scrolled in a display.

According to the present invention, there is provided a system for combining images comprising storing means for storing a plurality of image signals, generator means for generating a key signal representing a combining position in each of the image signals, composing means for composing the key signals with the image signals, and combining means for combining the image signals at the combining position based on the key signals.

The system further has a standard signal generator for generating standard signals for controlling operating timing of the generator means and combining means.

The other objects and features of this invention will become understood from the following description with reference to the accompanying drawings.

BRIEF DESCRIPTION OF DRAWINGS

FIGS. 2a, 2b and 2c are schematic views showing a signal composing operations of image signals with key signals;

FIG. 6 shows waveforms of the output signals of the unit;

DETAILED DESCRIPTION OF THE PREFERRED EMBODIMENTS

An image combining system of the present invention comprises signal composing unit and an image combining unit.

Figure 1:
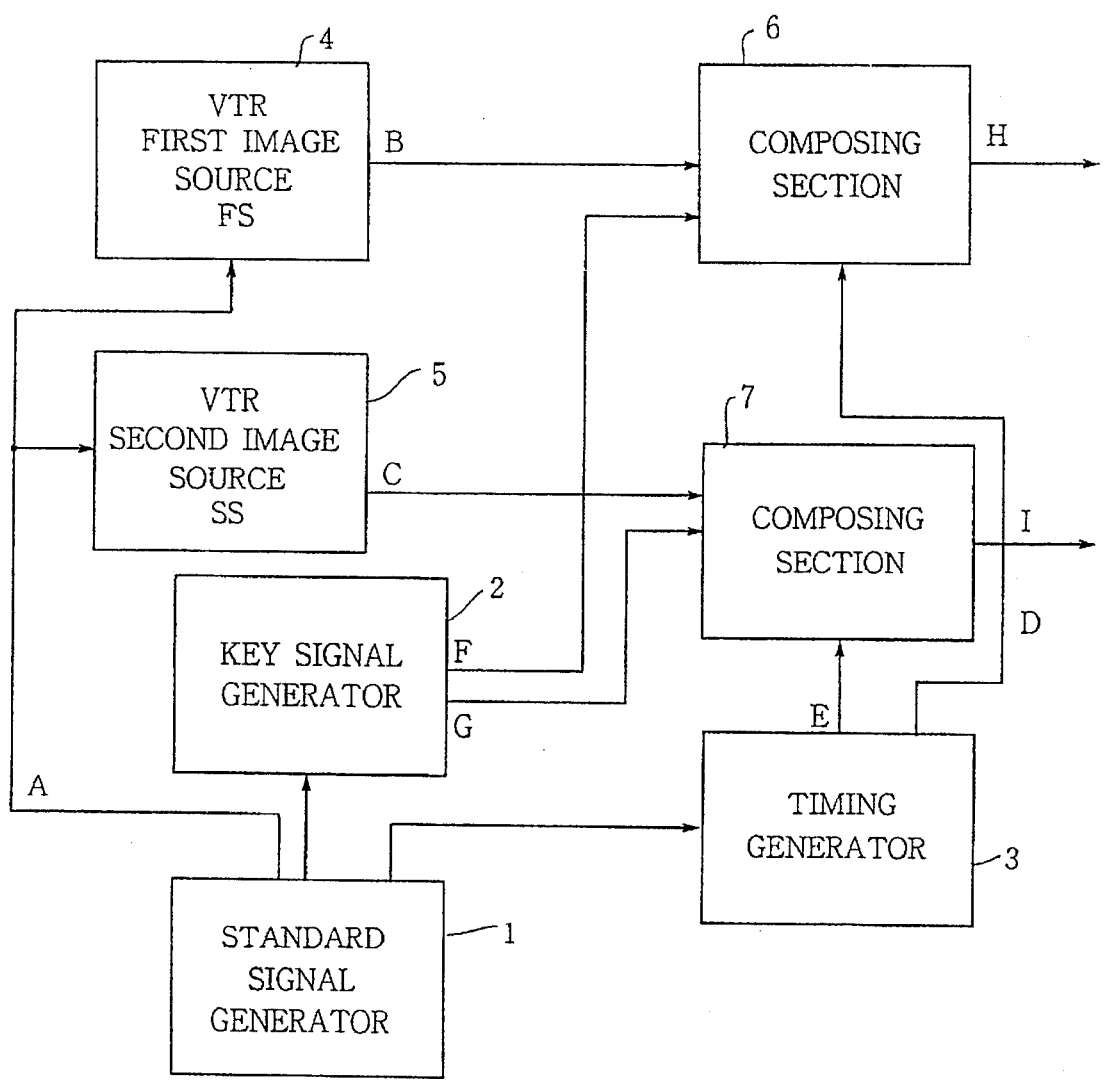
FIG. 1 is a block diagram showing a part of an image combining system according to the present invention.

Referring to FIG. 1 showing the signal composing unit, two cameras are used to take pictures to produce a first image source FS and a second image source SS, respectively. Both image sources are stored in the first and second VTRs 4 and 5. The image sources are NTSC signals. A standard signal generator 1 produces a standard signal A of a NTSC signal which is applied to the first and second VTRs 4 and 5. Based on the standard signal A, the first and second VTRs 4 and 5 produce first and second image signals B and C, respectively. The image signals B and C are applied to composing sections 6 and 7, respectively. The image signals are produced at a timing in synchronism with the standard signal A.

The standard signal of the standard signal generator 1 is further applied to a key signal generator 2 which produces a first key signal F and a second key signal G for determining split positions of the image sources FS and SS at every field. The first and second key signals F and G are applied to the composing sections 6 and 7 to be added to the image signals B and C, respectively.

A timing signal generator 3 is applied with the standard signal to produce timing signals D and E which are applied to the composing sections 6 and 7. The timing signals determine timings for adding the key signals F and G to the image signals B and C. The first and second key signals F and G are added to the image signals B and C at timings D and E shown in FIG. 3, and first and second image signals H and I composed with the key signals F and G are produced from the composing sections 6 and 7.

Figure 3:
FIG. 3 shows waveforms of output signals of the unit.

The operation of the image combining unit will be described. FIG. 3 shows waveforms of the respective output signals A to I. The first and second image signals B and C produced based on the image sources FS and SS and the standard signal A are composed with the first and second key signals F and G in accordance with the timing signals D and E. The system is so designed that the timing signals are produced at predetermined timings near a vertical blanking interval of each image signal. Therefore, the key signals F and G for splitting the image sources are located near the vertical blanking. Thus, the first and second image signals H and I added with the key signals F and G are produced.

In each of the image signals H and I, signals between the vertical blanking interval and the key signal are eliminated in order to simplify the construction of a split signal (key signal) detecting circuit.

FIGS. 2a to 2c show a concrete example of key signals for combining two images. As shown in FIG. 2b, the first image source FS is combined with the second image source SS. As shown in FIG. 2c, the first key signal F has an upgoing edge which is positioned at a center of the overlapped portions of the images, and has a downgoing edge which is positioned at the right edge of the first image. The second key signal G has an upgoing edge positioned at the left edge of the second image and a downgoing edge positioned at the center of the overlapped portions.

FIG. 2b shows a display area of one picture of the combined image.

As the key signal, a digital code can be used.

Figure 4:
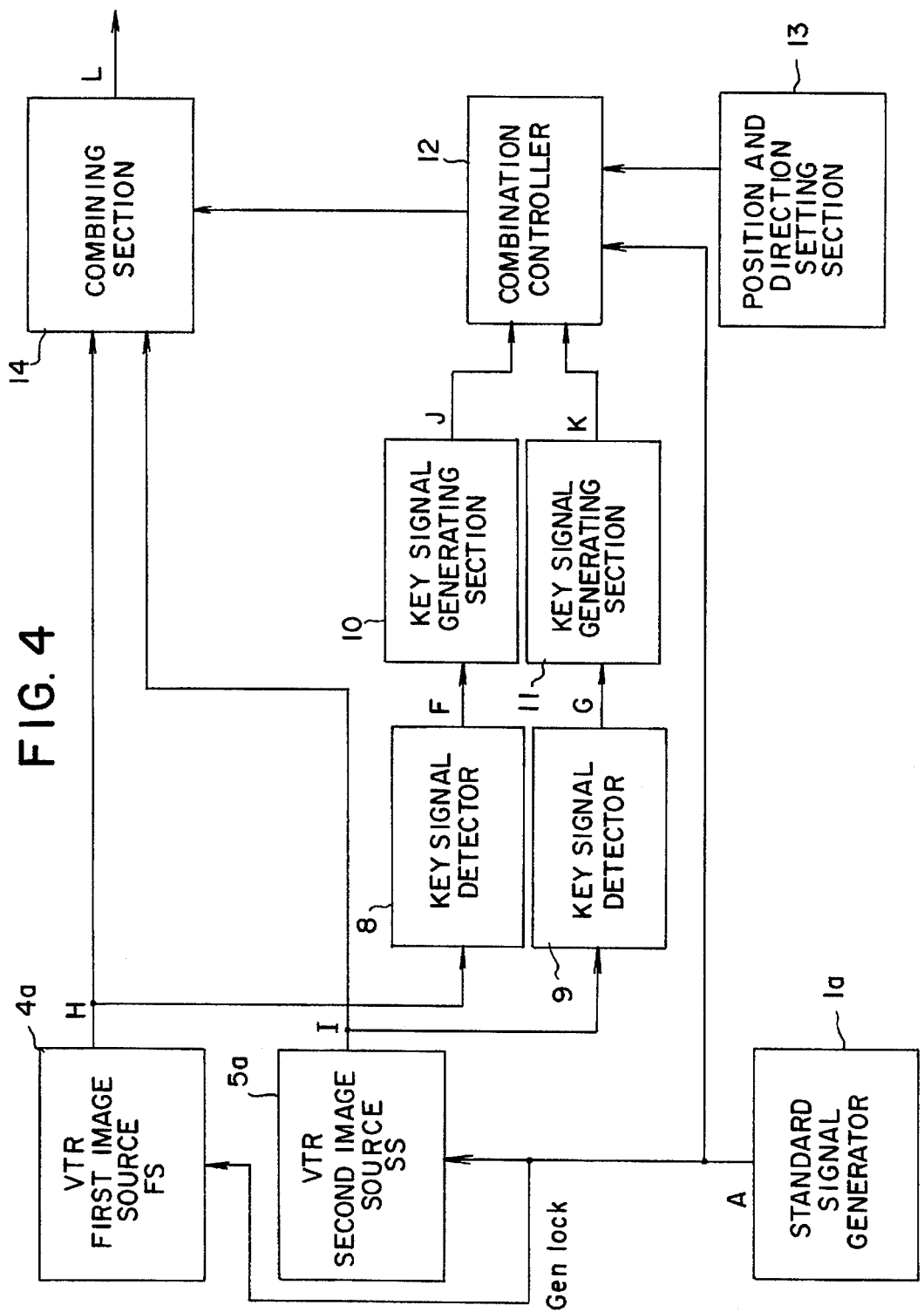
FIG. 4 is a block diagram showing a unit for combining images.

FIG. 4 shows the image combining unit of the system. The unit comprises a first image VTR 4a in which the first image signal H is stored, and a second image VTR 5a storing the second image signal I. The first and second image VTRs 4a and 5a are applied with the standard signal A of a standard signal generator 1a and image signals H and I are applied to a combining section 14 in accordance with the timing in synchronism with the standard signal A.

The image signals H and I are further applied to key signal detectors 8 and 9 which detect key signals F and G in the image signals H and I and derive the key signals from the image signals. The output signals are applied to key signal generating sections 10 and 11 which produces key signals J and K as position signals to determine position for combining image signals.

The key signals J and K are applied to a combination controller 12. The combination controller 12 is further applied with an output signal of a position and direction setting section 13 which is operated to set a position of a combined scene in the display and a direction for moving the scene. The controller 12 operates to control a combining operation of the image signals in the combining section 14 based on the key signals J and K and a position and direction signal from the position and direction setting section 12. The controller 14 produces a combined image signal L to be reproduced.

FIG. 6 shows waveforms of output signals of the image reproducing unit. The signals A, H, I, F and G are the same signals as those in FIG. 3 of the signal composing unit. The combined image signal L is produced in accordance with key signals J and K when the position and direction are set.

Figure 5:
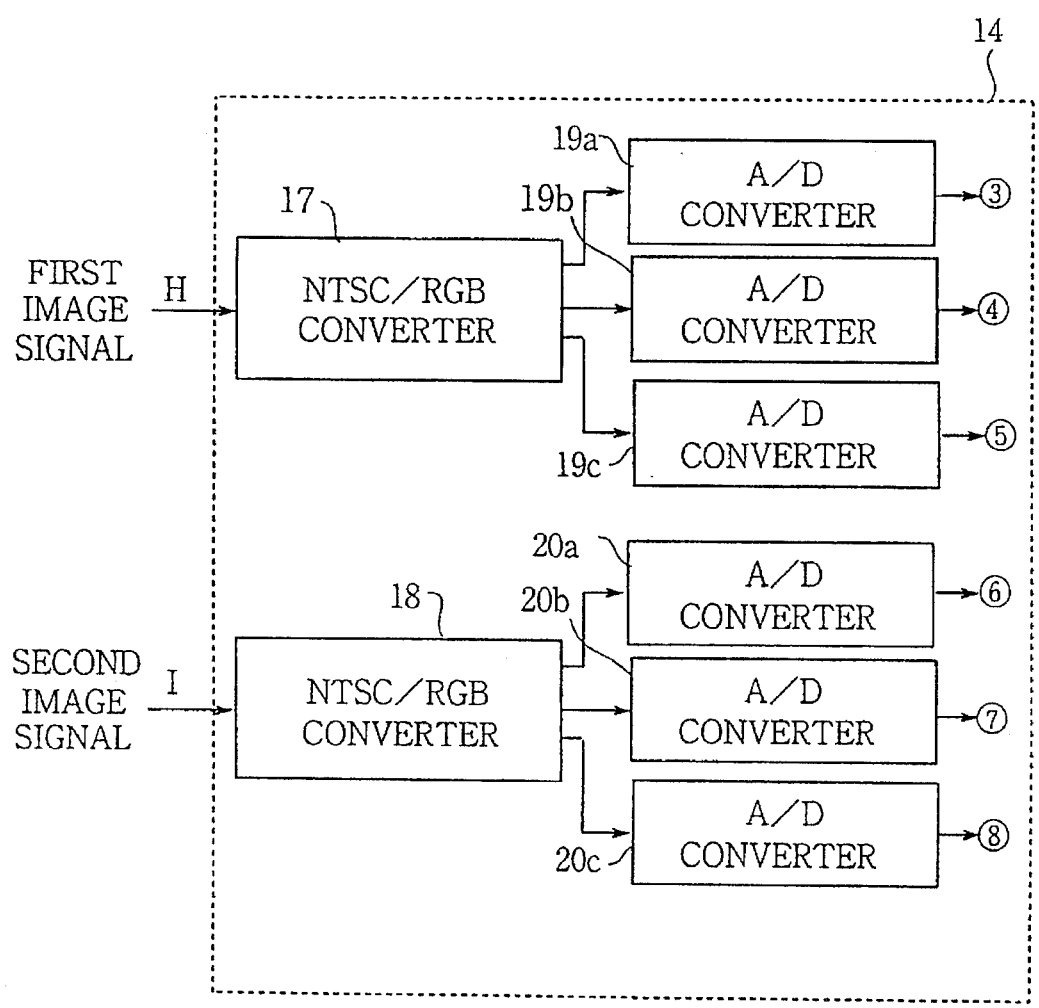
FIGS. 5a through 5c are block diagrams showing a detail of the unit of FIG. 4.
Figure 5:
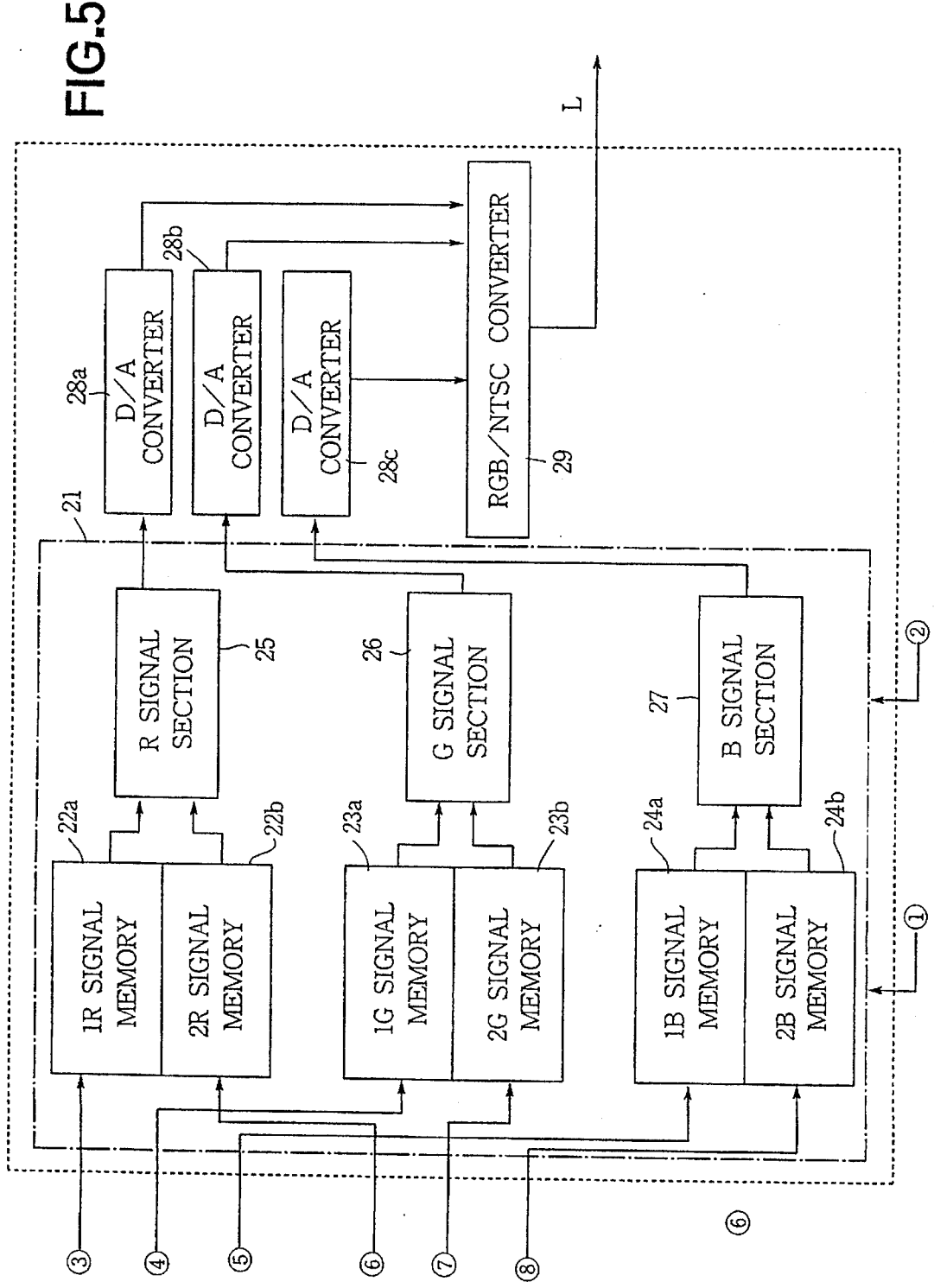
Figure 5C:
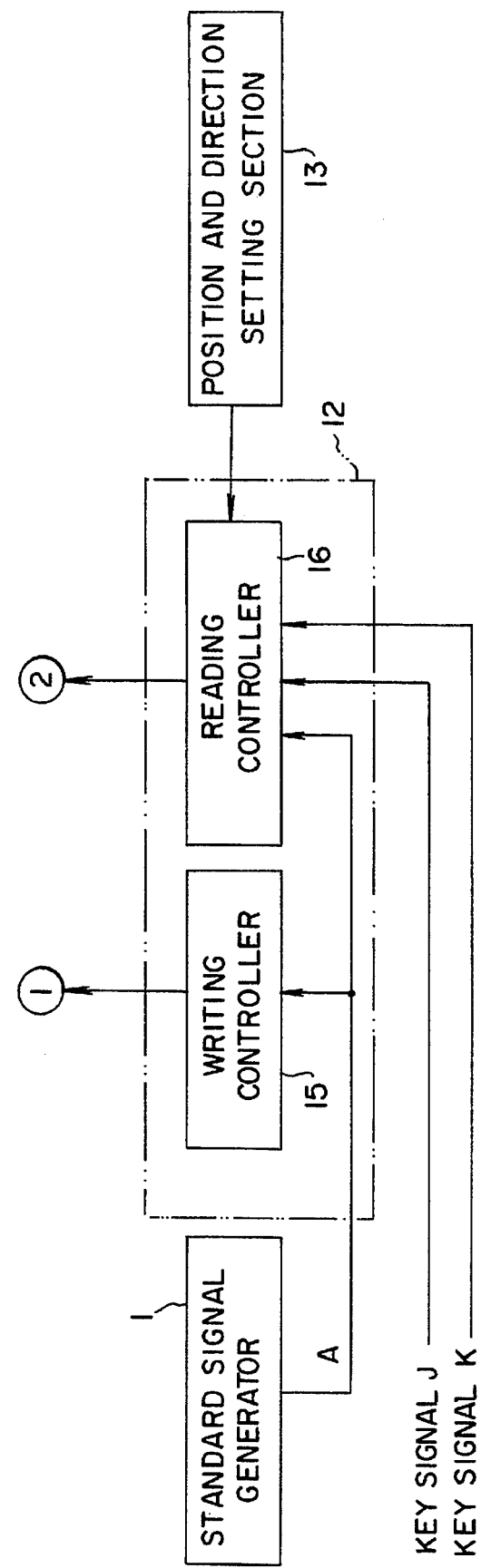

Referring to FIG. 5 showing the details of the image combining unit, the combination controller 12 comprises a writing controller 15 (FIG. 5c) applied with the signal A and a reading controller 16 applied with signals A, J and K and position and direction signal.

The combining section 14 comprises an NTSC/RGB converter 17 (FIG. 5a) applied with the first image signal H stored in the first image VTR 4a, and an NTSC/RGB converter 18 applied with the second image signal I stored in the second image VTR 5a. In the converters 17 and 18, the image signals H and I of the NTSC signals are converted into the video signals of R (red), G (green) and B (blue). The R, G and B video signals of the first image signal H are applied to A/D converters 19a, 19b and 19c, respectively, in which R, G and B video signals are converted into digital signals. Similarly, the R, G and B video signals of the second image signal I are applied to A/D converters 20a, 20b and 20c respectively, for converting the video signals into digital signals. The converted digital signals are applied to a frame memory 21 (FIG. 5b).

The frame memory 21 has memories 22a and 22b, 23a and 23b, and 24a and 24b, selectors 25, 26 and 27. The R video signals of the first image signal (1R signal) and the second image signal (2R signal) converted at the A/D converters 19a and 20a are stored in the memories 22a and 22b, respectively. The G video signals of the first and second image signals (1G signal and 2G signal) converted at the A/D converters 19b and 20b are stored in the memories 23a and 23b, respectively. The B video signals of the first and second image signals (1B signal and 2B signal) converted at the A/D converters 19c and 20c are stored in the memories 24a and 24b, respectively. Each of the memories is applied with a writing signal from the writing controller 15 of the synthetic controller 12. Thus, the respective video signals are written and stored in the respective memories in accordance with the writing signal.

The 1R and 2R signals stored in the memories 22a and 22b are selected by the selector 25 for the R video signal.

The 1G and 2G signals in the memories 23a and 23b are selected by the selector 26 for he G video signal, and the 1B and 2B signals in the memories 24a and 24b are selected by the selector 27 for the B video signal. The selectors are operated in accordance with a reading signal from the reading controller 16.

The video signals selected by the respective selectors are applied to D/A converters 28a, 28b and 28c, respectively, in which the digital signals are converted into analog signals. The converted analog signal are applied to an RGB/NTSC converter 29 in which R, G and B video signals are converted into the image signal L of NTSC signal.

Figure 7:
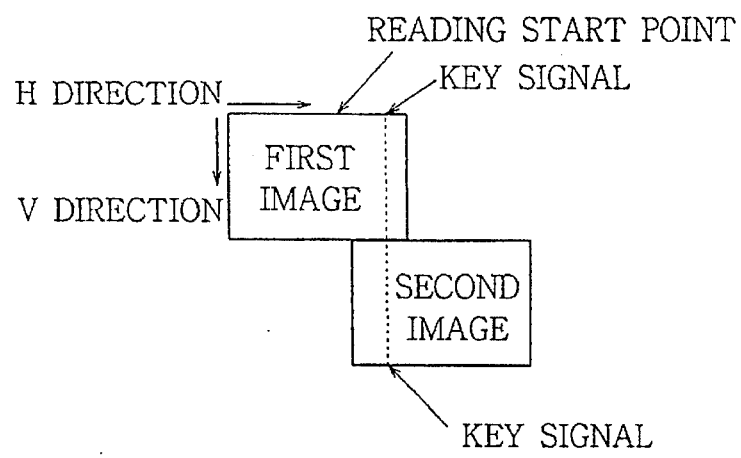
FIG. 7 is a schematic view showing a combining operation of the images.

The operation of the image combining unit will be described with reference to FIG. 7. When a desired reading position is set in accordance with the position and direction setting section 13, the R, G and B video signals are controlled in accordance with the reading signals of the reading controller 16.

Since the operations of video signals are the same, the operation of the R video signal will be described.

If a desired reading position is set in the horizontal (H) direction, the R signal selector 25 selects the 1R signal stored in the memory 22a, and the 1R signal is read to the position of the key signal J. Then, the selector 25 selects the 2R signal in the memory 22b, and the 2R signal is read at the position of the key signal K. The first image and the second image are overlapped at the predetermined portions and fixed to each other.

Figure 8:
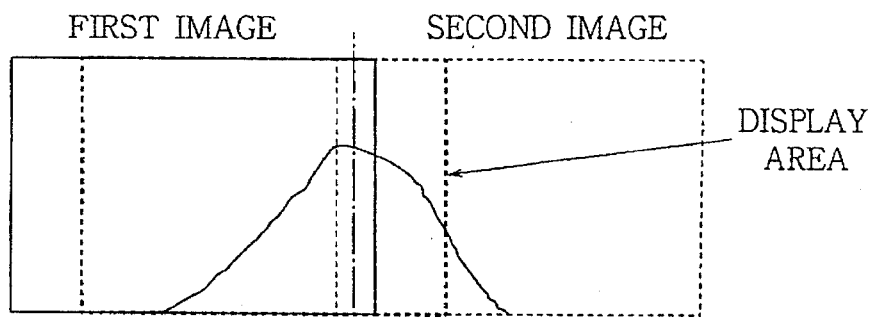
FIGS. 8a, 8b and 8c are schematic views showing combined images.
Figure 8:
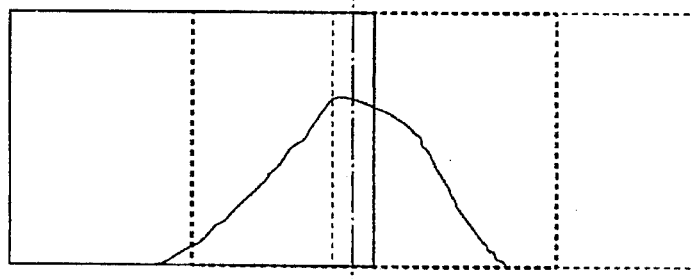
Figure 8:
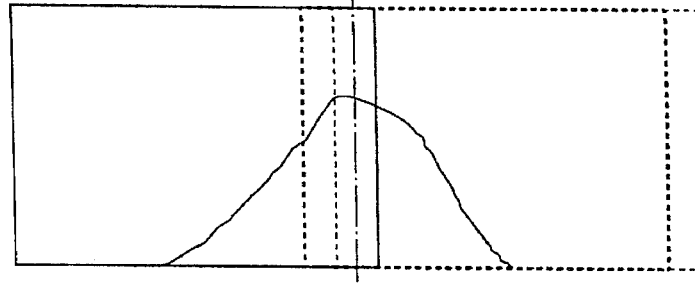

If the direction is set by the section 13, the displaying area in the display is changed. As shown in FIGS. 8a, 8b and 8c, if the direction is set to the rightword direction, the display area is moved to the right.

In place of the NTSC system, the high-vision system may be used. If key signals are added to both sides of the image, it is possible to select one of either sides, or a plurality of image sources.

In accordance with the present invention, the key signals are added to the image signal at every field for determining split and combined positions and the image signals are combined based on the key signals. Since the combined position of the image signals are optionally set, the split positions are continuously selected. Furthermore, the combined image on the display area can be scrolled.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for combining images comprising:

a display means;

storing means for storing and for outputting a plurality of image signals;

key signal generator means for generating a key signal representing a combining position in each of the image signals;

composing means for composing the key signals with the image signals and for outputting composed signals;

combining means for combining said image signals at the combining position based on the key signals;

standard signal generator means having an output which in input to said storing means, said key signal generator means and said combining means, said standard signal generator means for generating standard signals for controlling operating timing of said key signal generator means and combining means; and position and direction setting means for applying a setting signal to said combining means to set a position of a combined scene in the display means and a direction for moving the scene.

2. The system according to claim 1 wherein the key signal is generated at a timing near a vertical blanking interval of the image signal.

* * * * *